(12) United States Patent
Chuang et al.

(10) Patent No.: US 12,314,457 B2
(45) Date of Patent: May 27, 2025

(54) ANTI-TAMPERING DETECTOR AND METHOD FOR DETECTING PHYSICAL ATTACK

(71) Applicant: PUFsecurity Corporation, Hsinchu County (TW)

(72) Inventors: Kai-Hsin Chuang, Hsinchu County (TW); Chi-Yi Shao, Hsinchu County (TW); Chun-Heng You, Hsinchu County (TW)

(73) Assignee: PUFsecurity Corporation, Hsinchu County (TW)

( * ) Notice: Subject to any disclaimer, the term of this patent is extended or adjusted under 35 U.S.C. 154(b) by 85 days.

(21) Appl. No.: 18/219,710

(22) Filed: Jul. 10, 2023

(65) Prior Publication Data

US 2024/0220669 A1 Jul. 4, 2024

(30) Foreign Application Priority Data

Jan. 4, 2023 (TW) ................................. 112100171

(51) Int. Cl.
*G06F 21/81* (2013.01)
*G06F 21/88* (2013.01)

(52) U.S. Cl.
CPC .............. *G06F 21/81* (2013.01); *G06F 21/88* (2013.01)

(58) Field of Classification Search
CPC ........ G06F 21/70; G06F 21/755; G06F 21/82; G06F 21/86; G06F 21/87; G06F 21/88
See application file for complete search history.

(56) References Cited

U.S. PATENT DOCUMENTS

| | | | |
|---|---|---|---|
| 7,590,880 B1 * | 9/2009 | Hershman | G06F 21/755 713/400 |
| 7,853,805 B1 * | 12/2010 | Srinivasa | G06F 21/73 713/193 |

(Continued)

FOREIGN PATENT DOCUMENTS

| | | |
|---|---|---|
| CN | 1448844 A | 10/2003 |
| JP | 2003-150451 A | 5/2003 |

(Continued)

OTHER PUBLICATIONS

Pei Luo, Yunsi Fei, "Faulty Clock Detection for Crypto Circuits Against Differential Faulty Analysis Attack", 2016, IACR ePrint, USA.

*Primary Examiner* — Hosuk Song
(74) *Attorney, Agent, or Firm* — Winston Hsu

(57) ABSTRACT

An anti-tampering detector and a method for detecting a physical attack are provided, wherein the anti-tampering detector includes a temperature sensor, a voltage detector, a frequency detector and a controller. The temperature sensor is configured to generate a temperature code according to an operation temperature. The voltage detector is configured to generate a voltage code according to a supply voltage and the temperature code. The frequency detector is configured to generate a frequency code according to a system clock, the temperature code and the voltage code. The controller is configured to generate an anti-tampering detection result according to the temperature code, the voltage code and the frequency code. The anti-tampering detection result indicates whether any of the operation temperature, the supply voltage and the system clock is tampered with due to the physical attack.

19 Claims, 11 Drawing Sheets

(56) References Cited

U.S. PATENT DOCUMENTS

| | | | |
|---|---|---|---|
| 9,575,903 B2 * | 2/2017 | Glew | G06F 21/71 |
| 9,898,625 B2 | 2/2018 | Olmos | |
| 9,996,707 B2 * | 6/2018 | Sengupta | G06F 21/70 |
| 10,972,460 B2 * | 4/2021 | Ko | G06K 19/07372 |
| 11,636,210 B2 * | 4/2023 | Yardi | G06F 3/0304 |
| | | | 713/2 |
| 11,776,372 B2 * | 10/2023 | Lundy | G08C 17/02 |
| | | | 340/539.13 |
| 2013/0241690 A1 | 9/2013 | Wallace | |
| 2015/0052622 A1 | 2/2015 | Cabler | |
| 2015/0317496 A1 | 11/2015 | Olmos | |
| 2022/0019701 A1 | 1/2022 | Yang | |
| 2022/0412814 A1 | 12/2022 | G | |
| 2024/0220669 A1 * | 7/2024 | Chuang | G01R 31/31719 |

FOREIGN PATENT DOCUMENTS

| | | |
|---|---|---|
| JP | 2003-256793 A | 9/2003 |
| JP | 2009-123071 A | 6/2009 |
| JP | 2020-136592 A | 8/2020 |
| TW | 200949678 A1 | 12/2009 |
| TW | 202122993 A | 6/2021 |

* cited by examiner

ANTI-TAMPERING DETECTOR AND METHOD FOR DETECTING PHYSICAL ATTACK

BACKGROUND OF THE INVENTION

1. Field of the Invention

The present invention is related to anti-tampering circuits, and more particularly, to an anti-tampering detector and a method for detecting a physical attack.

2. Description of the Prior Art

Circuit attacks include multiple types of physical attacks, such as voltage attacks, voltage glitch attacks, frequency attacks, clock glitch attacks and temperature attacks. For example, an overpowered or underpowered supply voltage may be fed to a chip or the chip may be over/underclocked to make an operation of the chip abnormal. In addition, a positive pulse or a negative pulse may be injected to a power wire or a clock signal of the chip to make the chip malfunction or abnormally operate at specific time points. Furthermore, an environment temperature of the chip may be changed to make the operation of the chip abnormal.

In order to prevent data within the chip from being tampered or stolen due to the physical attacks mentioned above, related detection circuits may be equipped in the chip, to inform the system when a physical attack is detected. These detection circuits are typically implemented with analog circuits or mix-signal circuits, which often require expensive calibration. In addition, related art detection mechanisms can easily be impacted by various factors such as operating temperature and voltage, increasing the difficulty of correctly detecting the multiple types of physical attacks mentioned above.

Thus, there is a need for a novel architecture and an associated method, to solve the problem of the related art.

SUMMARY OF THE INVENTION

An objective of the present invention is to provide an anti-tampering detector and a method for detecting a physical attack, which enables the anti-tampering detector to determine actual operation conditions (such as an operation temperature, a supply voltage and a frequency of a system clock) of a chip without introducing any side effect or in a way that is less likely to introduce side effects, to allow the chip to activate a related protection mechanism in response to the physical attacks mentioned above.

At least one embodiment of the present invention provides an anti-tampering detector for detecting a physical attack. The anti-tampering detector comprises a temperature sensor, a voltage detector, a frequency detector and a controller, wherein the voltage detector is coupled to the temperature sensor, the frequency detector is coupled to the temperature sensor and the voltage detector, and the controller is coupled to the temperature sensor, the voltage detector and the frequency detector. In particular, the temperature sensor is configured to generate a temperature code according to an operation temperature. The voltage detector is configured to generate a voltage code according to a supply voltage and the temperature code. The frequency detector is configured to generate a frequency code according to a system clock, the temperature code and the voltage code. The controller is configured to generate an anti-tampering detection result according to the temperature code, the voltage code and the frequency code. More particularly, the anti-tampering detection result indicates whether any of the operation temperature, the supply voltage and the system clock is tampered with due to the physical attack.

At least one embodiment of the present invention provides a method for detecting a physical attack. The method comprises: generating a temperature code according to a first clock output from a proportional to absolute temperature (PTAT) oscillator and first calibration mapping information, wherein the temperature code represents an operation temperature; generating a voltage code according to a second clock output from a voltage controlled oscillator (VCO), the temperature code and second calibration mapping information, wherein the voltage code represents a supply voltage; generating a frequency code according to a third clock output from a reference oscillator, the temperature code, the voltage code and third calibration mapping information, wherein the frequency code represents a frequency of a system clock; and utilizing a controller to generate an anti-tampering detection result according to the temperature code, the voltage code and the frequency code, wherein the anti-tampering detection result indicates whether any of the operation temperature, the supply voltage and the system clock is tampered with due to the physical attack.

The anti-tampering detector and the method provided by the present invention utilize multiple oscillators for detecting operation conditions such as the temperature, the supply voltage and the frequency, and therefore the implementation of analog signals for representing the aforementioned information can be avoided. In addition, after temperature information is obtained, the present invention further detects the voltage based on the temperature information. After the voltage information is obtained, the present invention further detects the frequency based on the temperature information and the voltage information. Thus, the operation conditions of an overall system can be properly monitored, ensuring that various types of physical attacks can be detected.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
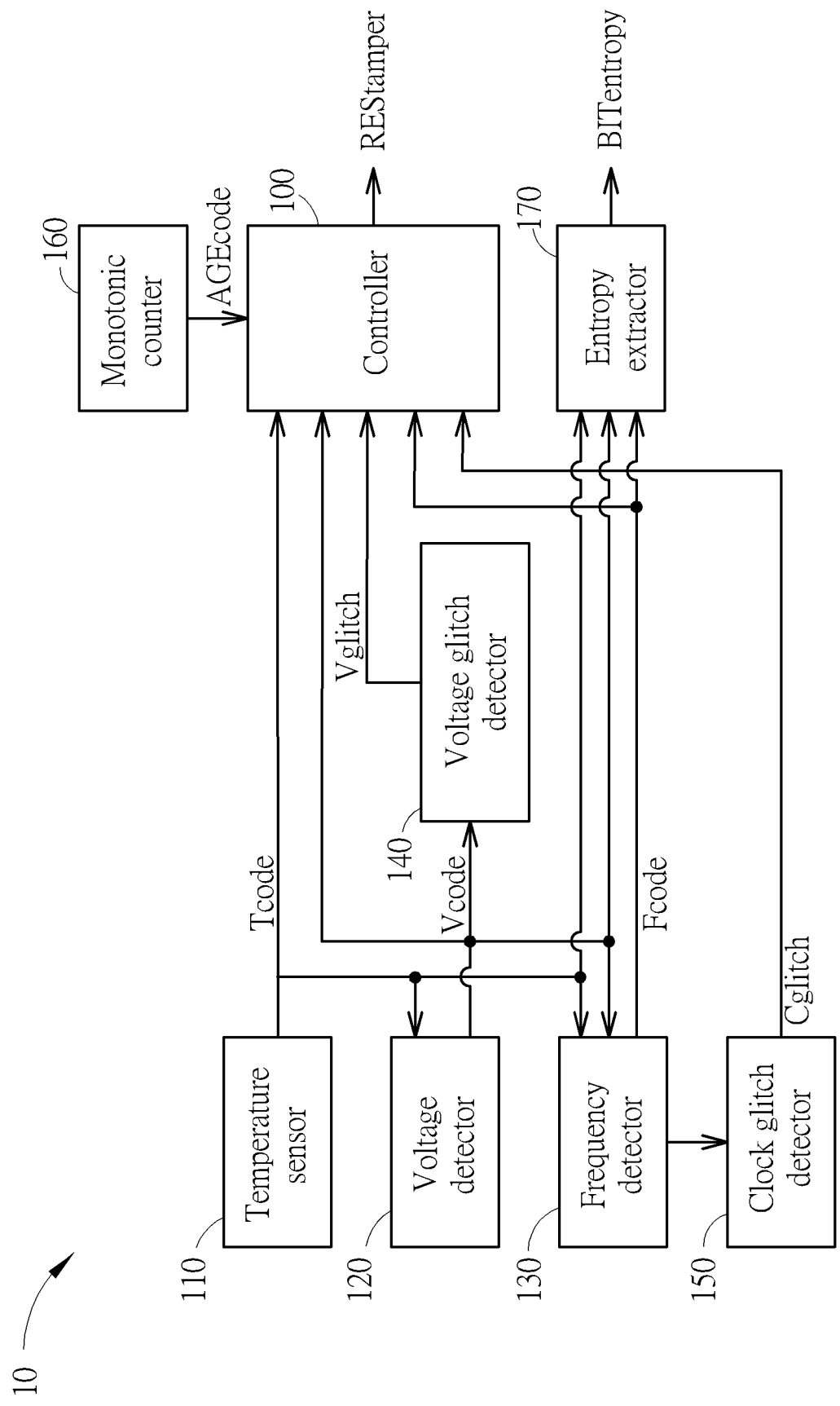
FIG. 1 is a diagram illustrating an anti-tampering detector according to an embodiment of the present invention.

FIG. 1 is a diagram illustrating an anti-tampering detector 10 according to an embodiment of the present invention, where the anti-tampering detector 10 is configured to detect a physical attack such as a voltage attack, a voltage glitch attack, a frequency attack, a clock glitch attack and a temperature attack. As shown in FIG. 1, the anti-tampering detector 10 may comprise a temperature sensor 110, a voltage detector 120, a frequency detector 130 and a controller 100, where the voltage detector 120 is coupled to the temperature sensor 110, the frequency detector is coupled to the temperature sensor 110 and the voltage detector 120, and the controller 100 is coupled to the temperature sensor 110, the voltage detector 120 and the frequency detector 130. In this embodiment, the temperature sensor 110 may generate a temperature code Tcode according to an operation temperature. The voltage detector 120 may generate a voltage code Vcode according to a supply voltage and the temperature code Tcode. The frequency detector 130 may generate a frequency code Fcode according to a system clock, the temperature code Tcode and the voltage code Vcode. The controller 100 may generate an anti-tampering detection result REStamper according to the temperature code Tcode, the voltage code Vcode and the frequency code Fcode, where the anti-tampering detection result REStamper may indicate whether any of the operation temperature, the supply voltage and the system clock is tampered with due to the physical attack.

For example, an operation condition of a chip comprising the anti-tampering detector 10 is predetermined to make the operation temperature fall in a temperature range, the supply voltage fall in a voltage range and a frequency of the system clock fall in a frequency range, where the anti-tampering detector 10 may detect whether any (e.g. each) of the operation temperature the supply voltage and the system clock falls in a specific operation range, to generate the anti-tampering detection result REStamper. The controller 100 may have a built-in storage device to store information of a specific operation range such as a temperature code range corresponding to the temperature range, a voltage code range corresponding to the voltage range, and a frequency code range corresponding to the frequency range. The controller 100 may determine whether the temperature code Tcode falls in the temperature code Tcode, determine whether the voltage code Vcode falls in the temperature code range, and determine whether the frequency code Fcode falls in the frequency code range. Once any of the operation temperature, the supply voltage and the system clock fails to fall in the specific operation range, the controller 100 may determine that the physical attack is detected, and the anti-tampering detection result REStamper is thereby generated.

The anti-tampering detector 10 may further comprise a monotonic counter 160, where the monotonic counter 160 is coupled to the controller 100, and may count an accumulated operation time of the anti-tampering detector 10 (or the chip comprising the anti-tampering detector 10) to generate aging information AGEcode. For example, when the anti-tampering detector 10 is powered on for the first time, the monotonic counter 160 may increase the aging information AGEcode from an initial value (e.g. zero) to a first accumulated value according to an operation time after this power-on. When the anti-tampering detector 10 is powered on for a second time, the monotonic counter 160 may increase the aging information AGEcode from the first accumulated value to a second accumulated value according to an operation time after this power-on. Deduced by analogy, the aging information AGEcode may keep increasing during the operation of the anti-tampering detector 10 and will not be reset due to power-off. Thus, the aging information AGEcode may represent a condition of a utilization time of the anti-tampering detector 10 (or the chip comprising the anti-tampering detector 10). In practice, operation conditions of components within the anti-tampering detector 10 may gradually deviate from initial conditions over time due to factors such as aging. Thus, the controller 100 may calibrate the specific operation range mentioned above according to the aging information AGEcode generated by the monotonic counter 160 (e.g. calibrating any of the temperature code range corresponding to the temperature code Tcode, the voltage code range corresponding to the voltage code Vcode, and the frequency code range corresponding to the frequency code Fcode), in order to properly determine whether any of the operation temperature, the supply voltage and the system clock is tampered with due to the physical attack under a condition where the factor of component aging is considered.

In this embodiment, the anti-tampering detector 10 may further comprise a voltage glitch detector 140, where the voltage glitch detector 140 is coupled to the voltage detector 120. For example, the voltage glitch detector 140 may detect a change of the voltage code Vcode to generate a voltage glitch detection result Vglitch, where the controller may further determine whether the supply voltage has any voltage glitch due to the physical attack according to the voltage glitch detection result Vglitch.

In this embodiment, the anti-tampering detector 10 may further comprise a clock glitch detector 150, where the clock glitch detector 150 is coupled to the frequency detector 130. The clock glitch detector 150 may detect a change of the frequency of the system clock to generate a clock glitch detection result Cglitch, where the controller 100 may further determine whether the system clock has any clock glitch due to the physical attack according to the clock glitch detection result Cglitch.

In practice, when the temperature sensor 110, the voltage detector 120 and the frequency detector 130 utilize high resolution digital signals to represent the operation temperature, the supply voltage and the frequency of the system clock (e.g. when a bit count of each of the temperature code Tcode, the voltage code Vcode and the frequency code Fcode is extremely high), a least significant bit (LSB) of each of the temperature code Tcode, the voltage code Vcode and the frequency code Fcode may keep changing due to factors such as noise, even if there is no physical attack. Thus, the controller 100 may discard the LSB of each of the temperature code Tcode, the voltage code Vcode and the frequency code Fcode, and determine whether the anti-tampering detector 10 (or the chip comprising the anti-tampering detector 10) suffers from the physical attack by only referring to the remaining bits. In addition, the anti-tampering detector 10 may further comprise an entropy extractor 170, where the entropy extractor 170 is coupled to the temperature sensor 110, the voltage detector 120 and the frequency detector 130. Based on the LSB of each of the temperature code Tcode, the voltage code Vcode and the frequency code Fcode which can easily be disturbed by noise, the entropy extractor 170 may generate an entropy output BITentropy according to the LSB of each of the temperature code Tcode, the voltage code Vcode and the frequency code Fcode, where the entropy output BITentropy may be one or more entropy bits which are generated by performing hashing, collecting and arranging operations according to the LSB of each of the temperature code Tcode, the voltage code Vcode and the frequency code Fcode, but the present invention is not limited thereto.

Figure 2:
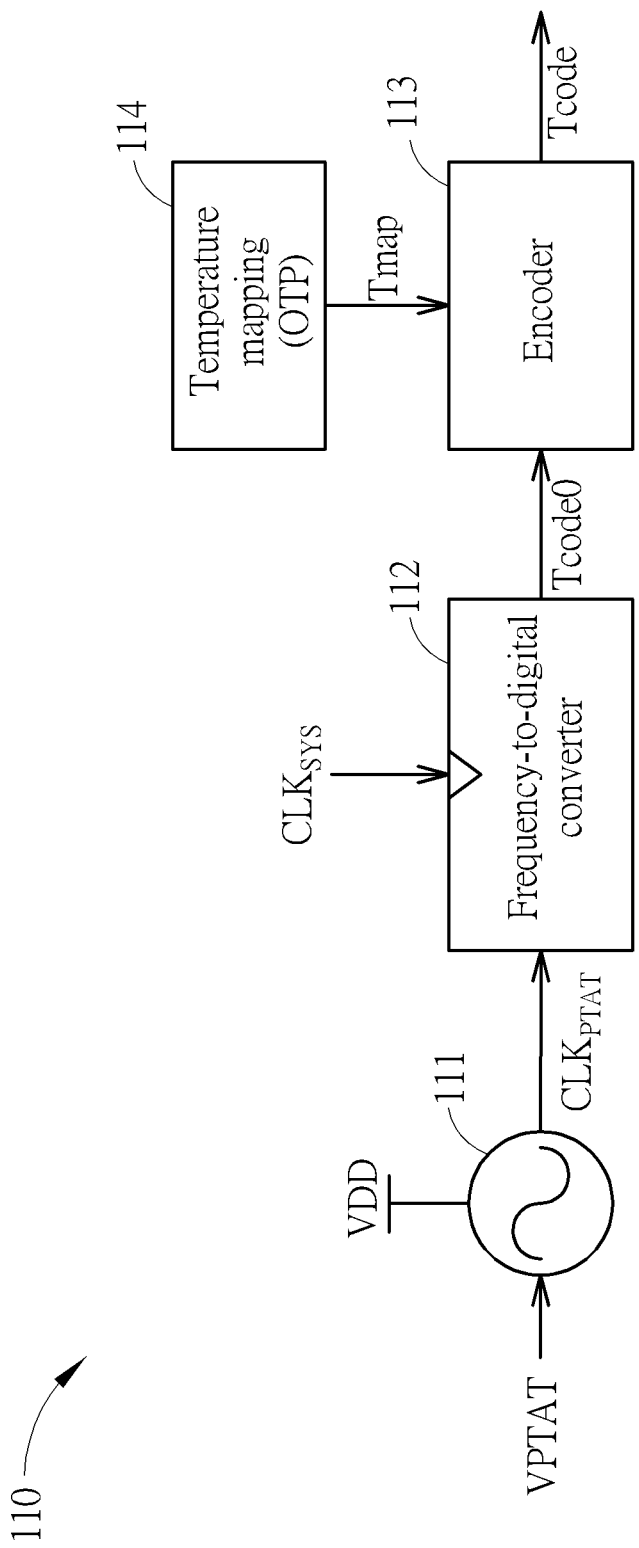
FIG. 2 is a diagram illustrating detailed implementation of a temperature sensor according to an embodiment of the present invention.

FIG. 2 is a diagram illustrating detailed implementation of the temperature sensor 110 according to an embodiment of the present invention. As shown in FIG. 2, the temperature sensor 110 may comprise a proportional to absolute temperature (PTAT) oscillator 111, a frequency-to-digital converter 112, a storage device such as a one-time programmable (OTP) storage device 114 and an encoder 113, where the frequency-to-digital converter 112 is coupled to the PTAT oscillator 111, and the encoder 113 is coupled to the frequency-to-digital converter 112 and the OTP storage device 114. In this embodiment, the PTAT oscillator 111 may output a PTAT clock $CLK_{PTAT}$, where a frequency of the PTAT clock $CLK_{PTAT}$ is determined according to the operation temperature. In this embodiment, a power of the PTAT oscillator 111 is provided by a supply voltage VDD, where the supply voltage VDD may be an example of the supply voltage mentioned in the embodiment of FIG. 1. In detail, the PTAT oscillator 111 may comprise a voltage controlled current source, and the frequency of the PTAT clock $CLK_{PTAT}$ is determined by a current of the voltage controlled current source and is not affected by variations in the supply voltage VDD, where the current of the voltage controlled current source is controlled by a PTAT voltage VPTAT, and a change in the PTAT voltage VPTAT may be proportional to a change in absolute temperature. Thus, information of the change in operation temperature can be obtained by detecting the frequency of the PTAT clock $CLK_{PTAT}$ without interference from a change in the supply voltage VDD or a smaller likelihood of being interfered with by the change in supply voltage VDD. For example, the frequency-to-digital converter 112 may perform frequency-to-digital conversion upon the frequency of the PTAT clock $CLK_{PTAT}$ to generate a digital code Tcode0 corresponding to the operation temperature.

In practice, operations of the PTAT oscillator 111 and the frequency-to-digital converter 112 may make different chips output different digital codes Tcode0 under a same temperature due to process variation. In order to overcome the problem that the operation temperature cannot be correctly detected due to the process variation, calibration mapping information Tmap corresponding to a process condition of the chip (e.g. a process corner that the chip belongs to, such as an SS corner, an FF corner or a TT corner) may be written into the OTP storage device 114 (labeled "Temperature mapping (OTP)" for better comprehension) according to the process condition of the chip during a test phase before leaving the factory, and the encoder 113 may receive the digital code Tcode0 and further generate the temperature code Tcode according to the calibration mapping information Tmap stored in the OTP storage device 114. Thus, after the calibration, the temperature code Tcode output from the temperature sensor 110 can correctly represent the operation temperature without being affected by a manufacturing process.

Figure 3:
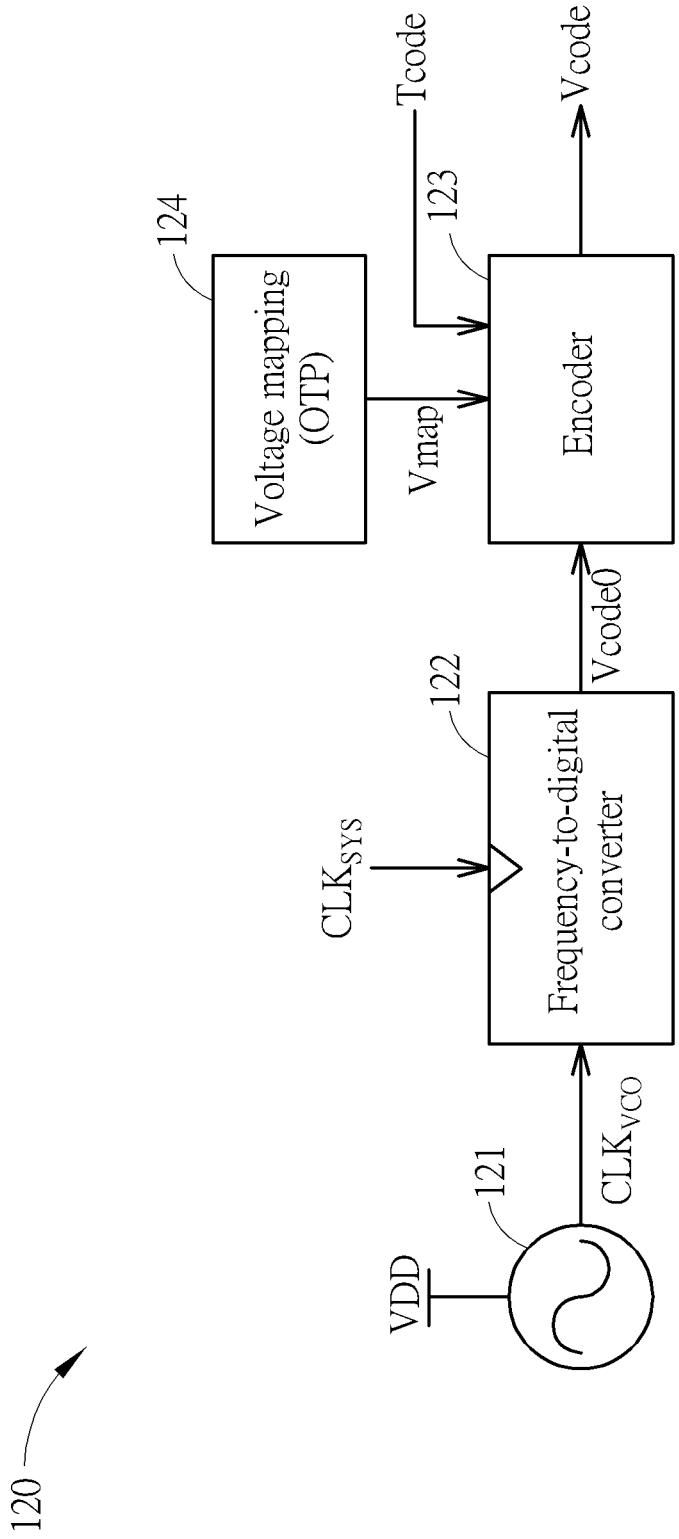
FIG. 3 is a diagram illustrating detailed implementation of a voltage detector according to an embodiment of the present invention.

FIG. 3 is a diagram illustrating a detailed implementation of the voltage detector 120 according to an embodiment of the present invention. As shown in FIG. 3, the voltage detector 120 may comprise a voltage controlled oscillator (VCO) 121, a frequency-to-digital converter 122, a storage device such as an OTP storage device 124 and an encoder 123, where the frequency-to-digital converter 122 is coupled to the VCO 121, and the encoder 123 is coupled to the frequency-to-digital converter 122 and the OTP storage device 124. In this embodiment, the VCO 121 may output a voltage controlled clock $CLK_{VCO}$, where a frequency of the voltage controlled clock $CLK_{VCO}$ is determined according to the supply voltage VDD. For example, the change of the supply voltage VDD may be proportional to a change of the frequency of the voltage controlled clock $CLK_{VCO}$. Thus, information of the change in supply voltage VDD may be obtained by detecting the frequency of the voltage controlled clock $CLK_{VCO}$. For example, the frequency-to-digital converter 122 may perform frequency-to-digital conversion upon the frequency of the voltage controlled clock $CLK_{VCO}$ to generate a voltage code Vcode0 corresponding to the supply voltage VDD.

In practice, in addition to the process variation factor, the VCO 121 may be affected by the operation temperature. Thus, in order to overcome the problem that the supply voltage VDD cannot be correctly detected due to the process and temperature factors, calibration mapping information Vmap corresponding to the process condition of the chip (e.g. the process corner that the chip belongs to, such as the SS corner, the FF corner or the TT corner) may be written into the OTP storage device 124 (labeled "Voltage mapping (OTP)" for better comprehension) according to the process condition of the chip during the test phase before leaving the factory. The calibration mapping information Vmap comprises voltage-to-digital mapping relationships of the digital code Vcode0 and the voltage code Vcode under multiple operation temperatures. Thus, after receiving the digital code Vcode0 and the temperature code Tcode, the encoder 123 may select corresponding specific calibration mapping information from the calibration mapping information Vmap according to the temperature code Tcode, and then generate the voltage code Vcode according to this specific calibration mapping information and the digital code Vcode0. Thus, after the calibration, the voltage code Vcode output from the voltage detector 120 can correctly represent a voltage level of the supply voltage without being affected by variations in process and temperature.

Figure 4:
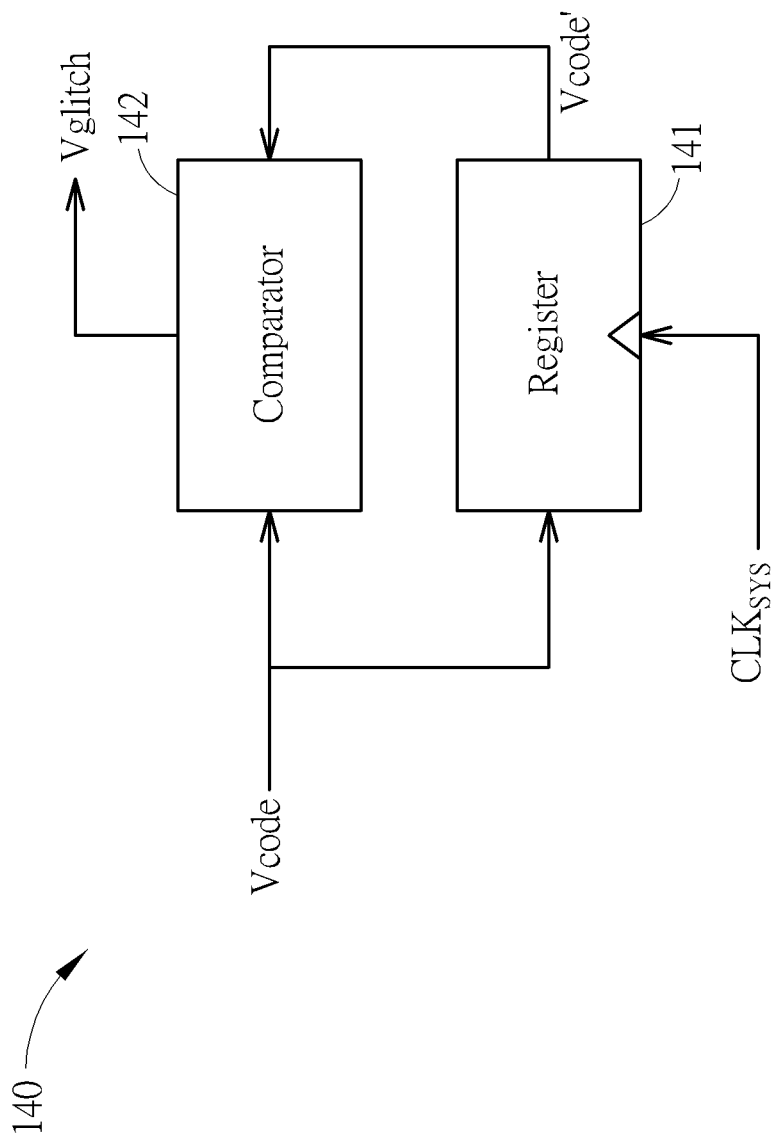
FIG. 4 is a diagram illustrating detailed implementation of a voltage glitch detector according to an embodiment of the present invention.

FIG. 4 is a diagram illustrating a detailed implementation of the voltage glitch detector 140 according to an embodiment of the present invention. As shown in FIG. 4, the voltage glitch detector 140 may comprise a register 141 and a comparator 142, where the comparator 142 is coupled to the register 141. In this embodiment, the voltage code Vcode has a previous value during a previous cycle of the system clock $CLK_{SYS}$, and the voltage code Vcode has a present value during a present cycle of the system clock $CLK_{SYS}$, where the register 141 may store the previous value of the voltage code Vcode, and the comparator 142 may compare the previous value of the voltage code Vcode with the present value of the voltage code Vcode to generate the voltage glitch detection result Vglitch. For example, in the present cycle, the voltage code Vcode output from the voltage detector 120 may represent the present value of the voltage code Vcode, and a voltage code Vcode' output from the register 141 may represent the previous value of the voltage code Vcode. When the comparator 142 detects that a difference between the voltage code Vcode and the voltage code Vcode' is greater than a predetermined threshold, the comparator 142 may pull the voltage glitch detection result Vglitch to a logic value "1" for reporting the condition of a voltage glitch in supply voltage VDD to the controller 100.

Figure 5:
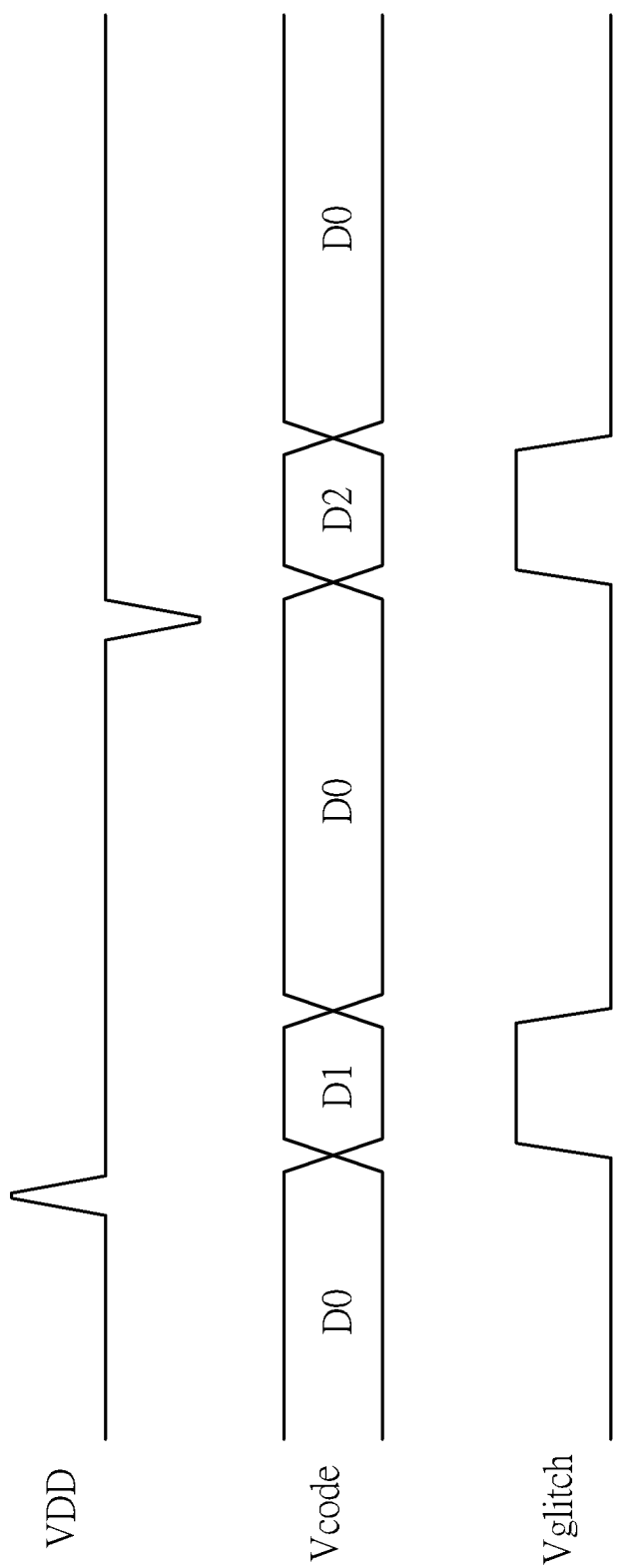
FIG. 5 is a diagram illustrating detection of voltage glitches on a supply voltage according to an embodiment of the present invention.

FIG. 5 is a diagram illustrating detection of voltage glitches on the supply voltage VDD according to an embodiment of the present invention. As shown in FIG. 5, when the supply voltage VDD has a positive glitch, the frequency of the VCO clock $CLK_{VCO}$ output from the VCO 121 may change and make the value of the voltage code Vcode output from the voltage detector 120 change (e.g. changing from D0 to D1), and the voltage glitch detector 140 may pull the voltage glitch detection result Vglitch from a logic value "0" to the logic value "1" in response to the change of the value of the voltage code Vcode. When the supply voltage VDD has a negative glitch, the frequency of the VCO clock $CLK_{VCO}$ output from the VCO 121 may change and make the value of the voltage code Vcode output from the voltage detector 120 change (e.g. changing from D0 to D2), and the voltage glitch detector 140 may pull the voltage glitch detection result Vglitch from the logic value "0" to the logic value "1" in response to the change of the value of the voltage code Vcode.

It should be noted that both the frequency-to-digital converters 112 and 122 perform the frequency-to-digital conversion based on the system clock $CLK_{SYS}$. For example, the frequency-to-digital converter 112 may generate the digital code Tcode0 by counting a cycle number of the PTAT clock $CLK_{PTAT}$ within a time interval specified by the system clock (e.g. one cycle specified by the system clock $CLK_{SYS}$). Even if both the operation temperature and a frequency of the system clock $CLK_{SYS}$ change due to the physical attack, the temperature code Tcode output from the temperature sensor 110 might be unchanged or maintained in the temperature range under some conditions, thereby making the controller 100 unable to detect the change in operation temperature. In another example, the frequency-to-digital converter 122 may generate the digital code Vcode0 by counting a cycle number of the VCO clock $CLK_{VCO}$ within a time interval specified by the system clock (e.g. one cycle specified by the system clock $CLK_{SYS}$). Even if both the supply voltage VDD and the frequency of the system clock $CLK_{SYS}$ change due to the physical attack, the voltage code Vcode output from the voltage detector 120 might be unchanged or maintained in the voltage range under some conditions, thereby making the controller 100 unable to detect the change of the voltage level of the supply voltage VDD.

Figure 6:
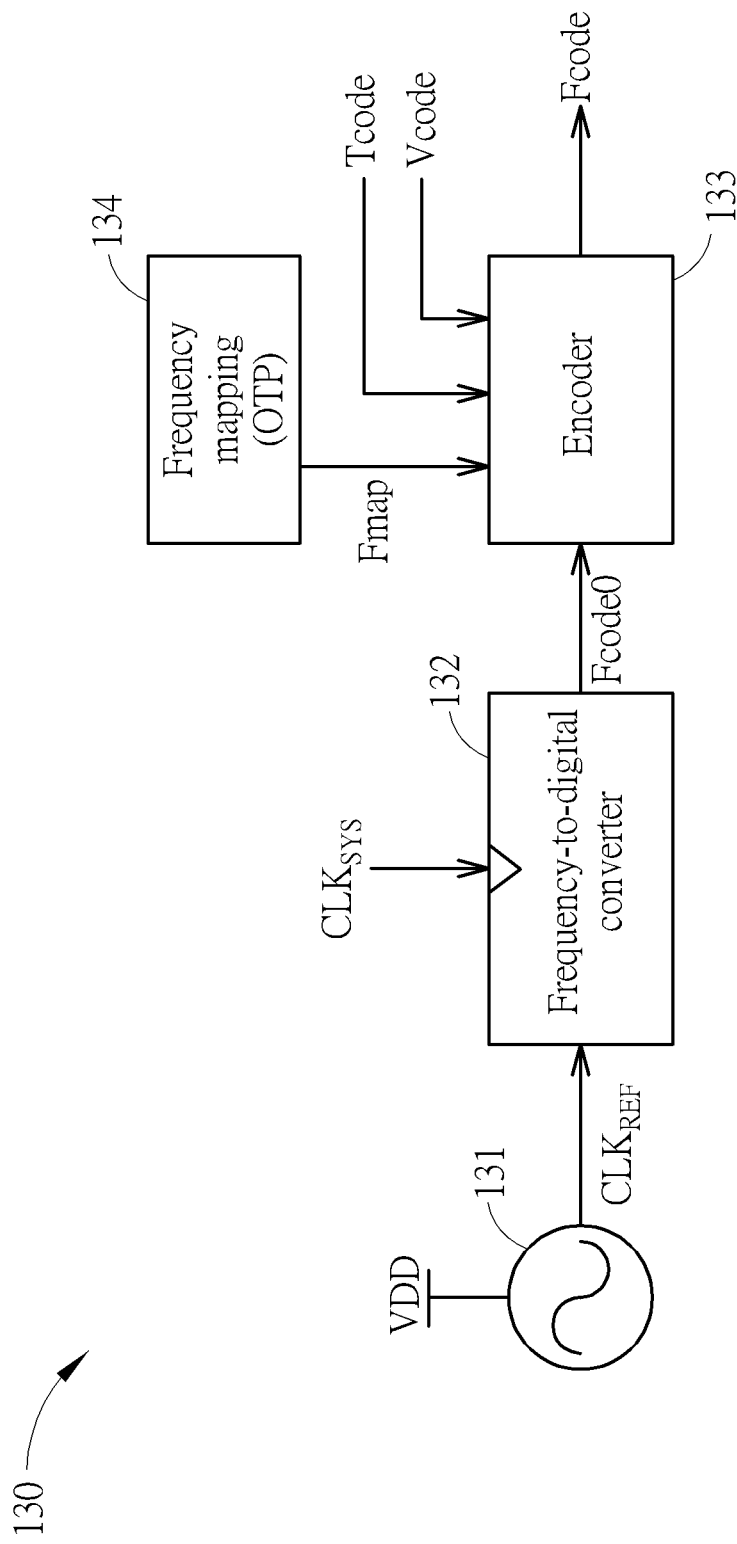
FIG. 6 is a diagram illustrating detailed implementation of a frequency detector according to an embodiment of the present invention.

The present invention can utilize the frequency detector 130 to monitor the frequency of the system clock $CLK_{SYS}$ to prevent the situation mentioned above. FIG. 6 is a diagram illustrating a detailed implementation of the frequency detector 130 according to an embodiment of the present invention. As shown in FIG. 6, the frequency detector 130 may comprise a reference oscillator 131, a frequency-to-digital converter 132, a storage device such as an OTP storage device 134 and an encoder 133, where the frequency-to-digital converter 132 is coupled to the reference oscillator 131, and the encoder is coupled to the frequency-to-digital converter 132 and the OTP storage device 134. In this embodiment, the reference oscillator 131 may output a reference clock $CLK_{REF}$, where a frequency of the reference clock $CLK_{REF}$ is greater than the frequency of the system clock $CLK_{SYS}$. In addition, the frequency-to-digital converter 132 may generate a digital code Fcode0 corresponding to the system clock $CLK_{SYS}$ according to the system clock $CLK_{SYS}$ and the reference clock $CLK_{REF}$. Thus, the change in frequency of the system clock $CLK_{SYS}$ can be detected by monitoring the digital code Fcode0.

In addition to the process variation factor mentioned above, the reference oscillator 131 may be affected by the operation temperature and the supply voltage VDD in practice. Thus, in order to overcome the problem that the frequency of the system clock $CLK_{SYS}$ cannot be correctly detected due to the process, temperature and supply voltage factors, calibration mapping information Fmap corresponding to the process condition of the chip (e.g. the process corner that the chip belongs to, such as the SS corner, the FF corner or the TT corner) may be written into the OTP storage device 134 (labeled "Frequency mapping (OTP)" for better comprehension) according to the process condition of the chip during the test phase before leaving the factory. The calibration mapping information Fmap comprises frequency-to-digital mapping relationships of the digital code Fcode0 and the frequency code Fcode under multiple operation temperatures and supply voltages VDD. Thus, after receiving the digital code Fcode0, the temperature code Tcode and the voltage code Vcode, the encoder 133 may select corresponding specific calibration mapping information from the calibration mapping information Fmap according to the temperature code Tcode and the voltage code Vcode, and then generate the frequency code Fcode according to this specific calibration mapping information and the digital code Fcode0. Thus, after the calibration, the frequency code Fcode output from the frequency detector 130 can correctly represent the frequency of the system clock $CLK_{SYS}$ without being affected by variations in process, temperature and voltage.

Figure 7:
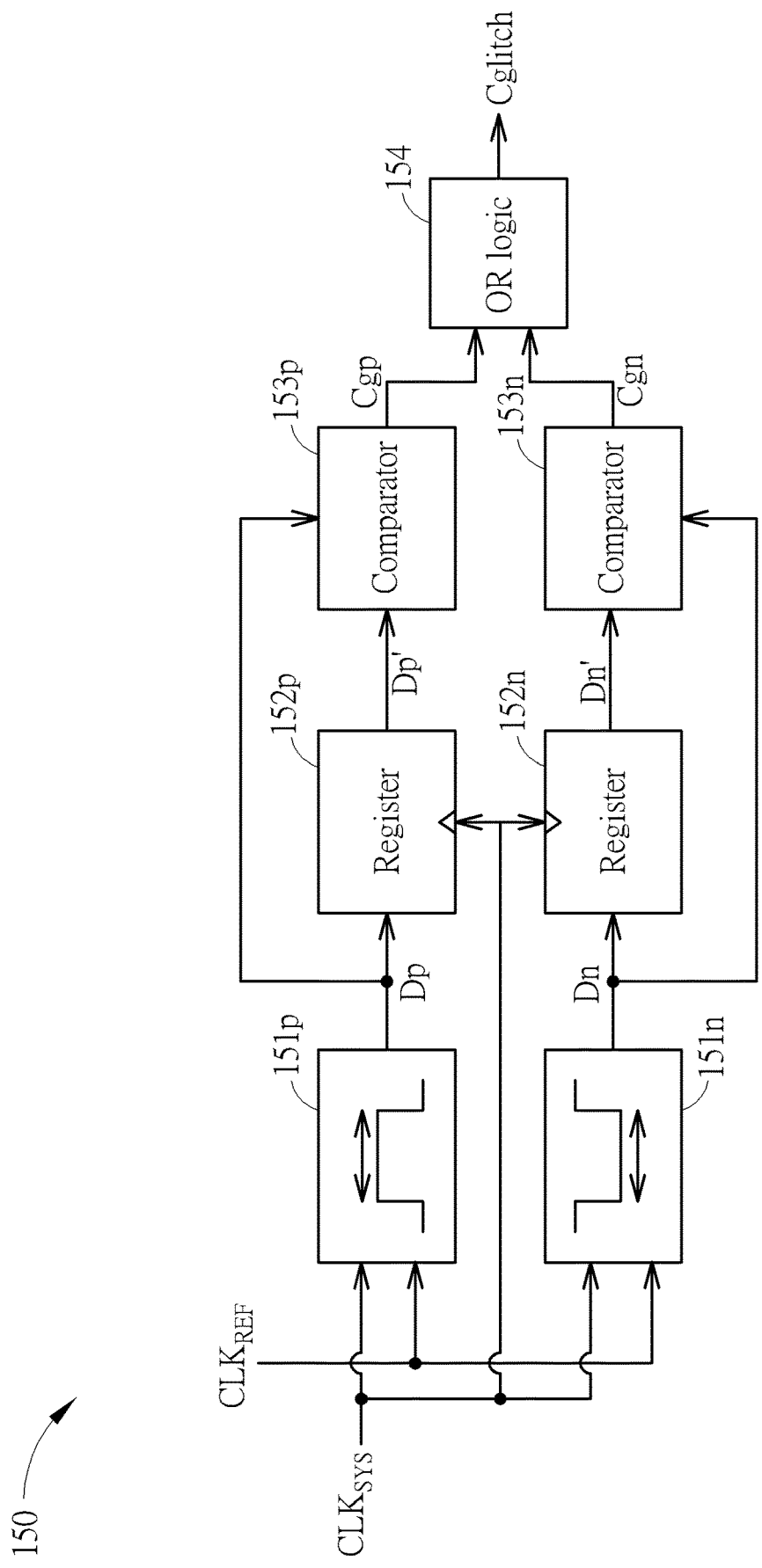
FIG. 7 is a diagram illustrating detailed implementation of a clock glitch detector according to an embodiment of the present invention.

FIG. 7 is a diagram illustrating a detailed implementation of a clock glitch detector 150 according to an embodiment of the present invention. As shown in FIG. 7, the clock glitch detector 150 may comprise a counter 151p, a register 152p, a comparator 153p, a counter 151n, a register 152n, a comparator 153n and an OR logic gate 154 (labeled "OR logic" in FIG. 7 for brevity). In this embodiment, the counter 151p may count a first cycle number of the reference clock $CLK_{REF}$ within a time interval of the system clock $CLK_{SYS}$ having a logic high state (e.g. the logic value "1"), to generate and transmit a counting result Dp to the register 152p, where the counting result Dp has a first previous value during a previous cycle of the system clock $CLK_{SYS}$, and the counting result Dp has a first present value during a present cycle of the system clock $CLK_{SYS}$. The comparator 153p may compare the first previous value of the counting result Dp with the first present value of the counting result Dp to generate a positive clock glitch detection result Cgp. For example, in the present cycle of the system clock $CLK_{SYS}$, the counting result Dp output from the counter 151p may represent the first present value of the counting result Dp, and a counting result Dp' output from the register 152p may represent the first previous value of the counting result Dp. In addition, the counter 151n may count a second cycle number of the reference clock $CLK_{REF}$ within a time interval of the system clock $CLK_{SYS}$ having a logic low state (e.g. the logic value "0"), to generate and transmit a counting result Dn to the register 152n, where the counting result Dn has a second previous value during the previous cycle of the system clock $CLK_{SYS}$, and the counting result Dn has a second present value during the present cycle of the system clock $CLK_{SYS}$. The comparator 153n may compare the second previous value of the counting result Dn with the second present value of the counting result Dn to generate a negative clock glitch detection result Cgn. For example, in the present cycle of the system clock $CLK_{SYS}$, the counting result Dn output from the counter 151n may represent the second present value of the counting result Dn, and a counting result Dn' output from the register 152n may represent the second previous value of the counting result Dn. In addition, the OR logic gate 154 may perform an OR logic operation upon the positive glitch detection result Cgp and the negative clock glitch detection result Cgn, to generate the clock glitch detection result Cglitch. Thus, when either of the positive glitch detection result Cgp and the negative clock glitch detection result Cgn indicates that the system clock $CLK_{SYS}$ has a glitch, the OR logic gate 154 may pull the clock glitch detection result Cglitch to the logic value "1" to inform the controller 100.

In some embodiments, the clock glitch detector 150 may detect positive clock glitches only. For example, the counter 151n, the register 152n, the comparator 153n and the OR logic gate 154 may be omitted, and the clock glitch detector 150 may output the positive glitch detection result Cgp as the clock glitch detection result Cglitch. In some embodiment, the clock glitch detector 150 may detect negative clock glitches only. For example, the counter 151p, the register 152p, the comparator 153p and the OR logic gate 154 may be omitted, and the clock glitch detector 150 may output the negative glitch detection result Cgn as the clock glitch detection result Cglitch.

Figure 8:
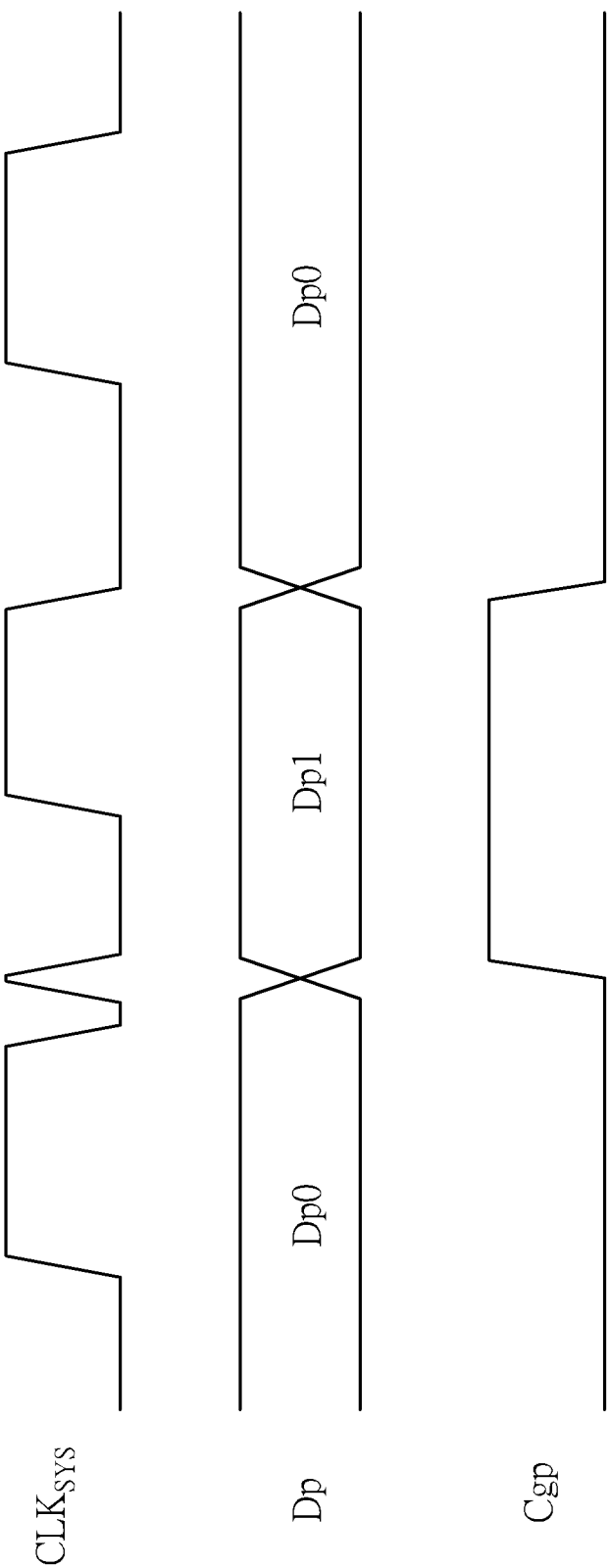
FIG. 8 is a diagram illustrating detection of clock glitches on a system clock according to an embodiment of the present invention.

FIG. 8 is a diagram illustrating detection of a positive clock glitch on the system clock $CLK_{SYS}$ according to an embodiment of the present invention. In this embodiment, a value of the counting result Dp is Dp0 when the system clock $CLK_{SYS}$ does not have any clock glitch (e.g. a time length of the system clock $CLK_{SYS}$ having the logic high state is kept at a fixed value). When the system clock $CLK_{SYS}$ has a positive clock glitch due to the physical attack (e.g. when the system clock $CLK_{SYS}$ is pulled to the logic high state during a period that the system clock $CLK_{SYS}$ is expected to be at the logic low state), the value of the counting result Dp may change (e.g. changing to Dp1), and the positive clock glitch detection result Cgp may be pulled to the logic value "1" to make the clock glitch detection result Cglitch be pulled to the logic value "1".

Figure 9:
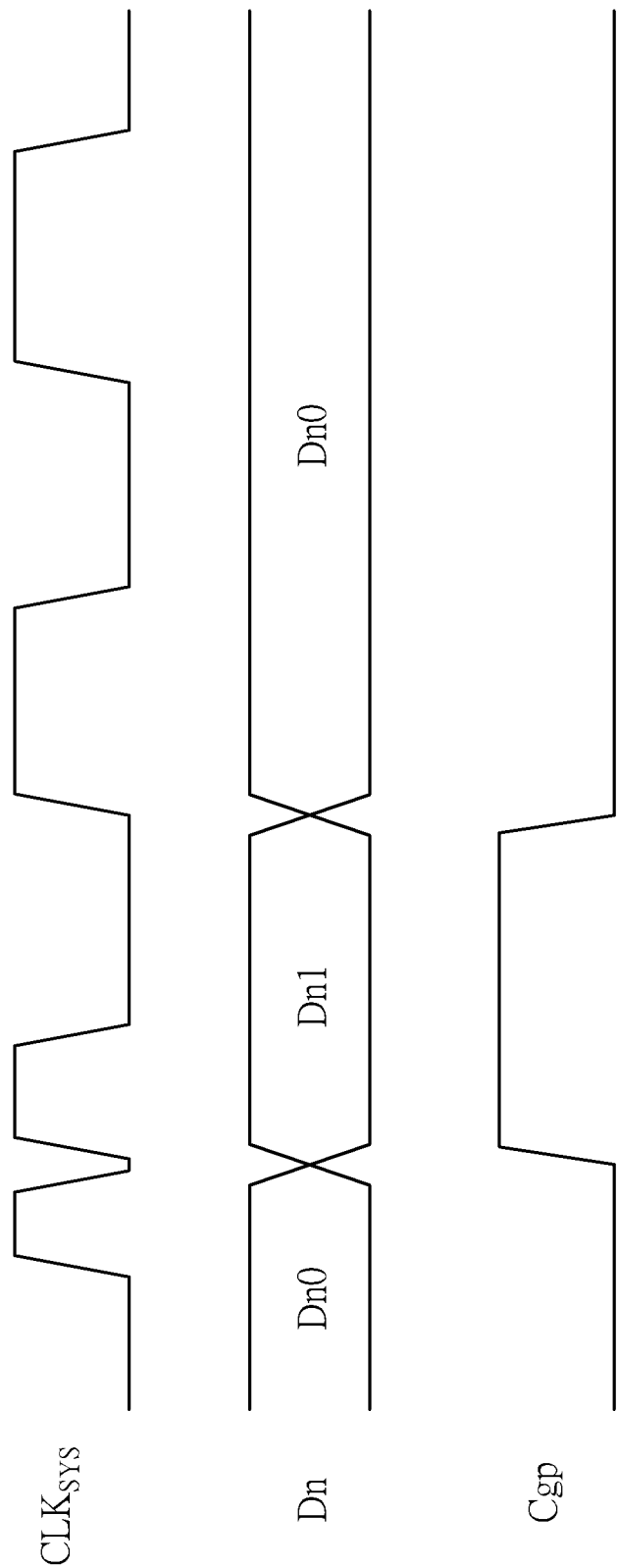
FIG. 9 is a diagram illustrating detection of clock glitches on a system clock according to another embodiment of the present invention.

FIG. 9 is a diagram illustrating detection of a negative clock glitch on the system clock $CLK_{SYS}$ according to an embodiment of the present invention. In this embodiment, a value of the counting result Dn is Dn0 when the system clock $CLK_{SYS}$ does not have any clock glitch (e.g. a time length of the system clock $CLK_{SYS}$ having the logic low state is kept at a fixed value). When the system clock $CLK_{SYS}$ has a negative clock glitch due to the physical attack (e.g. when the system clock $CLK_{SYS}$ is pulled to the logic low state during a period that the system clock $CLK_{SYS}$ is expected to be at the logic high state), the value of the counting result Dn may change (e.g. changing to Dn1), and the negative clock glitch detection result Cgn may be pulled to the logic value "1" to make the clock glitch detection result Cglitch be pulled to the logic value "1".

Figure 10:
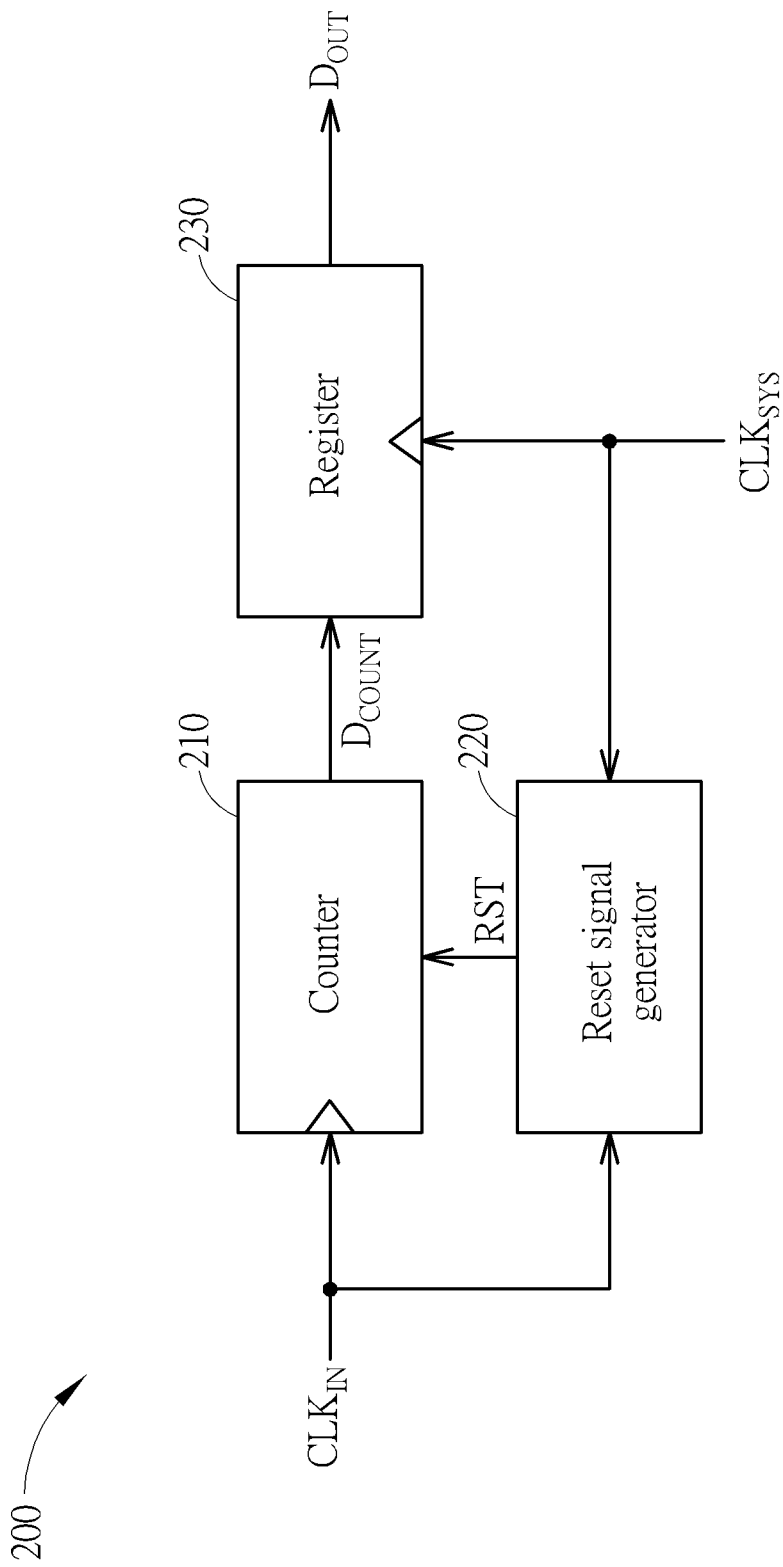
FIG. 10 is a diagram illustrating detailed implementation of a frequency-to-digital converter according to an embodiment of the present invention.

FIG. 10 is a diagram illustrating detailed implementation of a frequency-to-digital converter 200 according to an embodiment of the present invention, where any of the frequency-to-digital converter 112 shown in FIG. 2, the frequency-to-digital converter 122 shown in FIG. 3 and the frequency-to-digital converter 132 shown in FIG. 6 may be implemented based on the architecture of the frequency-to-digital converter 200. In this embodiment, the frequency-to-digital converter 200 may perform frequency-to-digital conversion upon an input clock $CLK_{IN}$ based on the system clock $CLK_{SYS}$ to generate an output code Dour, where the PTAT clock $CLK_{PTAT}$ shown in FIG. 2, the voltage controller clock $CLK_{VCO}$ shown in FIG. 3 and the reference clock $CLK_{REF}$ shown in FIG. 6 may be examples of the input clock $CLK_{IN}$, and the digital code Tcode0 shown in FIG. 2, the digital code Vcode0 shown in FIG. 3 and the digital code Fcode0 shown in FIG. 6 may be examples of the output code Dour.

As shown in FIG. 10, the frequency-to-digital converter 200 may comprise a counter 210, a reset signal generator 220 and a register 230, where the reset signal generator 220 is coupled to the counter 210, and the register 230 is coupled to the counter 210. In this embodiment, the counter 210 may count a cycle number of the input clock $CLK_{IN}$ within a time interval specified by the system clock $CLK_{SYS}$ to generate a counting result $D_{COUNT}$, where the time interval corresponds to the frequency of the system clock $CLK_{SYS}$. In addition, the reset signal generator 220 may generate a reset signal RST according to the reference clock $CLK_{REF}$ and the system clock $CLK_{SYS}$, to reset the counter 210 at a starting time point of the time interval, and the register 230 may store the counting result $D_{COUNT}$ at an ending time point of the time interval and output the counting result $D_{COUNT}$ as the output code Dour. In some embodiments, the time interval may be one cycle of the system clock $CLK_{SYS}$. In some embodiments, the time interval may be a period of the system clock $CLK_{SYS}$ having the logic high state. In some embodiments, the time interval may be a period of the system clock having the logic low state.

Figure 11:
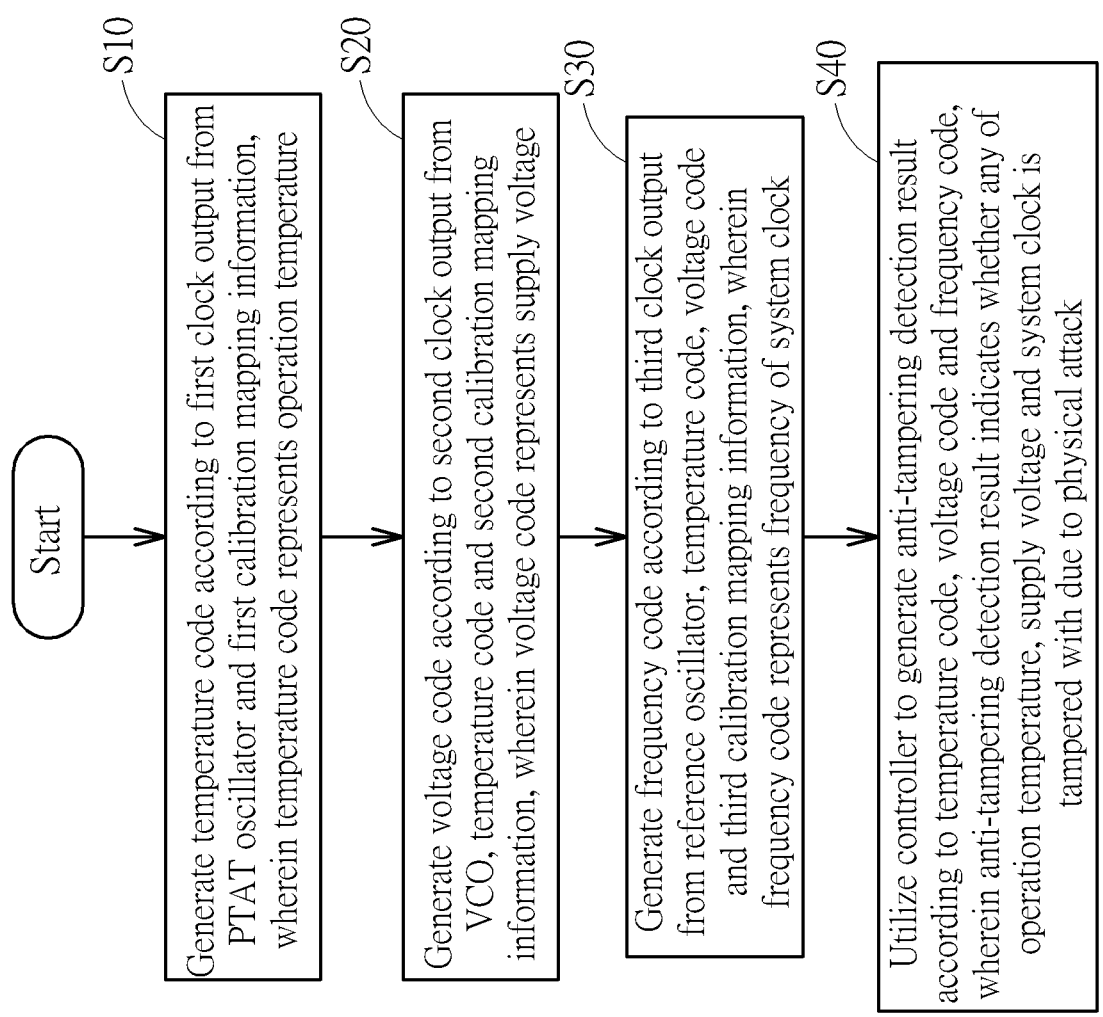
FIG. 11 is a diagram illustrating a working flow of a method for detecting a physical attack according to an embodiment of the present invention.

FIG. 11 is a diagram illustrating a working flow of a method for detecting a physical attack according to an embodiment of the present invention, where the working flow may be executed by the anti-tampering detector 10 shown in FIG. 1. It should be noted that the working flow shown in FIG. 11 is for illustrative purposes only, and is not meant to be a limitation of the present invention. For example, one or more steps may be added, deleted or modified in the working flow shown in FIG. 11. In addition, if a same result can be obtained, these steps do not have to be executed by the exact order shown in FIG. 11.

In Step S10, the anti-tampering detector 10 may generate a temperature code according to a first clock (e.g. the PTAT clock $CLK_{PTAT}$) output from a PTAT oscillator and first calibration mapping information (e.g. the calibration mapping information Tmap shown in FIG. 2, which is obtained by considering the manufacturing process), wherein the temperature code represents an operation temperature.

In Step S20, the anti-tampering detector 10 may generate a voltage code according to a second clock (e.g. the voltage controlled clock $CLK_{VCO}$) output from a VCO, the temperature code and second calibration mapping information (e.g. the calibration mapping information Vmap shown in FIG. 3, which is obtained by considering the manufacturing process), wherein the voltage code represents a supply voltage.

In Step S30, the anti-tampering detector 10 may generate a frequency code according to a third clock (e.g. the reference clock $CLK_{REF}$) output from a reference oscillator, the temperature code, the voltage code and third calibration mapping information (e.g. the calibration mapping information Fmap shown in FIG. 6, which is obtained by considering the manufacturing process), wherein the frequency code represents a frequency of a system clock.

In Step S40, the anti-tampering detector 10 may utilize a controller to generate an anti-tampering detection result according to the temperature code, the voltage code and the frequency code, wherein the anti-tampering detection result indicates whether any of the operation temperature, the supply voltage and the system clock is tampered with due to the physical attack.

To summarize, the anti-tampering detector and the associated method provided by the embodiments of the present invention can obtain information of the temperature, the voltage level of the supply voltage and the frequency of the system clock in the form of digital signals by detecting frequencies of multiple oscillators with the aid of calibration mapping information which is generated by considering the manufacturing process. Thus, the problem in the related art caused by utilizing analog circuits can be solved. In addition, the present invention detects the voltage based on temperature information after the temperature information is obtained, and further detects the frequency based on the temperature information and the voltage information after the voltage information is obtained. Thus, the operation condition of the overall system can be properly monitored, ensuring that various types of physical attacks can be detected.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An anti-tampering detector for detecting a physical attack, comprising:
    a temperature sensor, configured to generate a temperature code according to an operation temperature, wherein the temperature sensor comprises:
        a proportional to absolute temperature (PTAT) oscillator, configured to output a PTAT clock, wherein a frequency of the PTAT clock is determined according to the operation temperature; and
        a frequency-to-digital converter, coupled to the PTAT oscillator, configured to perform frequency-to-digital conversion upon the frequency of the PTAT clock to generate a digital code corresponding to the operation temperature;
    a voltage detector, coupled to the temperature sensor, configured to generate a voltage code according to a supply voltage and the temperature code;
    a frequency detector, coupled to the temperature sensor and the voltage detector, configured to generate a frequency code according to a system clock, the temperature code and the voltage code; and
    a controller, coupled to the temperature sensor, the voltage detector and the frequency detector, configured to generate an anti-tampering detection result according to the temperature code, the voltage code and the frequency code, wherein the anti-tampering detection result indicates whether any of the operation temperature, the supply voltage and the system clock is tampered with due to the physical attack.

2. The anti-tampering detector of claim 1, wherein the controller generates the anti-tampering detection result by detecting whether any of the operation temperature, the supply voltage and the system clock falls in a specific operation range.

3. The anti-tampering detector of claim 2, further comprising:
    a monotonic counter, coupled to the controller, configured to count an accumulated operation time of the anti-tampering detector to generate aging information;
    wherein the controller calibrates values of the specific operation range according to the aging information.

4. The anti-tampering detector of claim 1, wherein the temperature sensor further comprises:
    a storage device, configured to store calibration mapping information between the digital code and the temperature code; and
    an encoder, coupled to the frequency-to-digital converter and the storage device, configured to generate the temperature code according to the calibration mapping information and the digital code.

5. The anti-tampering detector of claim 1, further comprising:
    a voltage glitch detector, coupled to the voltage detector, configured to detect a change of the voltage code to generate a voltage glitch detection result;
    wherein the controller further generates the anti-tampering detection result according to the voltage glitch detection result.

6. The anti-tampering detector of claim 5, wherein the voltage code has a previous value during a previous cycle of the system clock, the voltage code has a present value during a present cycle of the system clock, and the voltage glitch detector comprises:
    a register, configured to store the previous value of the voltage code; and
    a comparator, configured to compare the previous value with the present value to generate the voltage glitch detection result.

7. An anti-tampering detector for detecting a physical attack, comprising:
    a temperature sensor, configured to generate a temperature code according to an operation temperature;
    a voltage detector, coupled to the temperature sensor, configured to generate a voltage code according to a supply voltage and the temperature code, wherein the voltage detector comprises:
        a voltage controlled oscillator (VCO), configured to output a voltage controlled clock, wherein a frequency of the voltage controlled clock is determined according to the supply voltage; and
        a frequency-to-digital converter, coupled to the VCO, configured to perform frequency-to-digital conversion upon the frequency of the voltage controlled clock to generate a digital code corresponding to the supply voltage;
    a frequency detector, coupled to the temperature sensor and the voltage detector, configured to generate a frequency code according to a system clock, the temperature code and the voltage code; and
    a controller, coupled to the temperature sensor, the voltage detector and the frequency detector, configured to generate an anti-tampering detection result according to the temperature code, the voltage code and the frequency code, wherein the anti-tampering detection result indicates whether any of the operation temperature, the supply voltage and the system clock is tampered with due to the physical attack.

8. The anti-tampering detector of claim 7, wherein the voltage detector further comprises:
    a storage device, configured to store calibration mapping information between the digital code and the voltage code; and
    an encoder, coupled to the frequency-to-digital converter and the storage device, configured to select specific calibration mapping information from the calibration mapping information according to the temperature code, and generate the voltage code according to the specific calibration mapping information and the digital code.

9. An anti-tampering detector for detecting a physical attack, comprising:
a temperature sensor, configured to generate a temperature code according to an operation temperature;
a voltage detector, coupled to the temperature sensor, configured to generate a voltage code according to a supply voltage and the temperature code;
a frequency detector, coupled to the temperature sensor and the voltage detector, configured to generate a frequency code according to a system clock, the temperature code and the voltage code, wherein the frequency detector comprises:
  a reference oscillator, configured to output a reference clock, wherein a frequency of the reference clock is greater than a frequency of the system clock; and
  a frequency-to-digital converter, coupled to the reference oscillator, configured to generate a digital code corresponding to the system clock according to the system clock and the reference clock; and
a controller, coupled to the temperature sensor, the voltage detector and the frequency detector, configured to generate an anti-tampering detection result according to the temperature code, the voltage code and the frequency code, wherein the anti-tampering detection result indicates whether any of the operation temperature, the supply voltage and the system clock is tampered with due to the physical attack.

10. The anti-tampering detector of claim 9, wherein the frequency detector further comprises:
a storage device, configured to store calibration mapping information between the digital code and the frequency code; and
an encoder, coupled to the frequency-to-digital converter and the storage device, configured to select specific calibration mapping information from the calibration mapping information according to the temperature code and the voltage code, and generate the frequency code according to the specific calibration mapping information and the digital code.

11. The anti-tampering detector of claim 9, further comprising:
a clock glitch detector, coupled to the frequency detector, configured to detect a change of the frequency of the system clock to generate a clock glitch detection result;
wherein the controller further generates the anti-tampering detection result according to the clock glitch detection result.

12. The anti-tampering detector of claim 9, wherein the frequency-to-digital converter comprises:
a counter, configured to count a cycle number of the reference clock within a time interval specified by the system clock to generate a counting result, wherein the time interval corresponds to the frequency of the system clock;
a reset signal generator, coupled to the counter, configured to generate a reset signal according to the reference clock and the system clock, to reset the counter at a starting time point of the time interval; and
a register, coupled to the counter, configured to store the counting result at an ending time point of the time interval and output the counting result as the digital code.

13. The anti-tampering detector of claim 11, wherein the clock glitch detector comprises:
a counter, configured to count a cycle number of the reference clock within a time interval of the system clock having a logic high state to generate a counting result, wherein the counting result has a previous value during a previous cycle of the system clock, and the counting result has a present value during a present cycle of the system clock; and
a comparator, configured to compare the previous value with the present value to generate the clock glitch detection result.

14. The anti-tampering detector of claim 11, wherein the clock glitch detector comprises:
a counter, configured to count a cycle number of the reference clock within a time interval of the system clock having a logic low state to generate a counting result, wherein the counting result has a previous value during a previous cycle of the system clock, and the counting result has a present value during a present cycle of the system clock; and
a comparator, configured to compare the previous value with the present value to generate the clock glitch detection result.

15. The anti-tampering detector of claim 11, wherein the clock glitch detector comprises:
a first counter, configured to count a first cycle number of the reference clock within a first time interval of the system clock having a logic high state to generate a first counting result, wherein the first counting result has a first previous value during a previous cycle of the system clock, and the first counting result has a first present value during a present cycle of the system clock;
a first comparator, configured to compare the first previous value with the first present value to generate a first comparison result;
a second counter, configured to count a second cycle number of the reference clock within a second time interval of the system clock having a logic low state to generate a second counting result, wherein the second counting result has a second previous value during the previous cycle of the system clock, and the second counting result has a second present value during the present cycle of the system clock;
a second comparator, configured to compare the second previous value with the second present value to generate a second comparison result; and
an OR logic gate, configured to perform an OR logic operation upon the first comparison result and the second comparison result to generate the clock glitch detection result.

16. A method for detecting a physical attack, comprising:
generating a temperature code according to a first clock output from a proportional to absolute temperature (PTAT) oscillator and first calibration mapping information, wherein the temperature code represents an operation temperature;
generating a voltage code according to a second clock output from a voltage controlled oscillator (VCO), the temperature code and second calibration mapping information, wherein the voltage code represents a supply voltage;
generating a frequency code according to a third clock output from a reference oscillator, the temperature code, the voltage code and third calibration mapping information, wherein the frequency code represents a frequency of a system clock; and utilizing a controller to generate an anti-tampering detection result according to the temperature code, the voltage code and the frequency code, wherein the anti-tampering detection result indicates whether any of the operation temperature, the supply voltage and the system clock is tampered due to the physical attack.

17. The method of claim 16, further comprising:

comparing a previous value of the voltage code during a previous cycle of the system clock with a present value of the voltage code during a present cycle of the system clock to generate a voltage glitch detection result;

wherein the anti-tampering detection result is generated further according to the voltage glitch detection result, for determining whether the supply voltage has any voltage glitch due to the physical attack.

18. The method of claim 16, further comprising:

counting a cycle number of the third clock within a time interval to generate a counting result, wherein the time interval is specified by a logic high state or a logic low state of the system clock; and comparing a previous value of the counting result during a previous cycle of the system clock with a present value of the counting result during a present cycle of the system clock to generate a clock glitch detection result;

wherein the anti-tampering detection result is generated further according to the clock glitch detection result, for determining whether the system clock has any clock glitch due to the physical attack.

19. The method of claim 16, further comprising:

utilizing a counter to count a cycle number of any tested clock among the first clock, the second clock and the third clock within a time interval specified by the system clock to generate a counting result, wherein the time interval corresponds to a frequency of the system clock;

generating a reset signal according to the tested clock and the system clock to reset the counter at a starting time point of the time interval; and utilizing a register to store the counting result at an ending time point of the time interval and output the counting result as a digital code corresponding to any of the operation temperature, the supply voltage and the frequency of the system clock.

* * * * *